Nov. 2, 1937.  W. N. WRIGHT ET AL  2,097,852
SAND TRAP
Filed Oct. 1, 1935
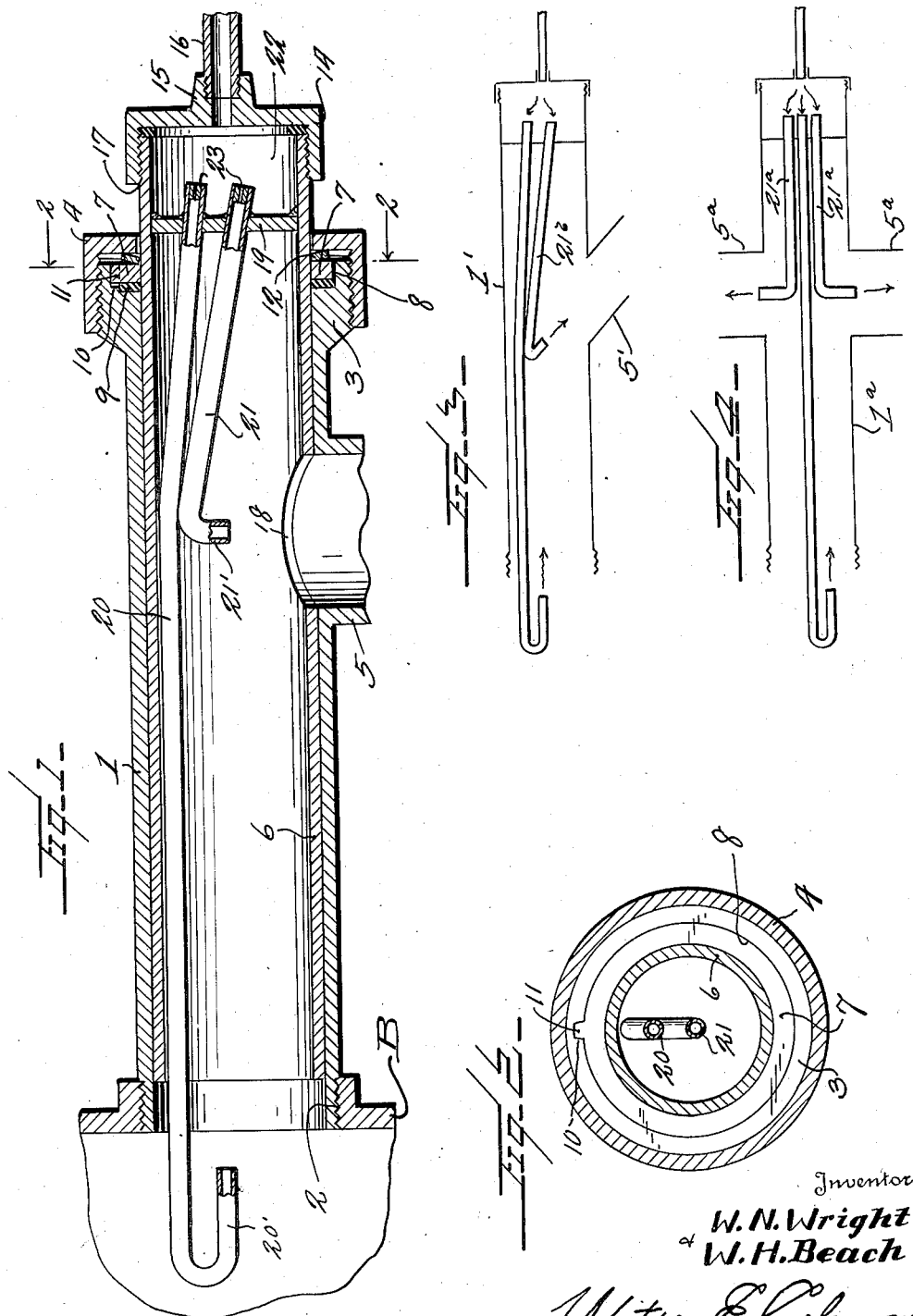
Inventors
W. N. Wright
W. H. Beach
By Watson E. Coleman
Attorney Patented Nov. 2, 1937

2,097,852

UNITED STATES PATENT OFFICE 2,097,852

SAND TRAP

William N. Wright, Washington, D. C., and William H. Beach, Alexandria, Va.

Application October 1, 1935, Serial No. 43,116

11 Claims. (Cl. 291—11)

This invention relates to a sand trap and has relation more particularly to a device of this kind for use in connection with a rail sander, and it is an object of the invention to provide a trap constructed and assembled in a manner to facilitate cleaning and repairs.

It is also an object of the invention to provide a trap of this kind provided with siphon and blast pipes to assure the proper delivery of sand to a rail and wherein a minimum amount of air is caused to pass through the siphon and blast pipes to avoid the sand being blown from the rails and wasted.

Another object of the invention is to provide a device of this kind which includes a removable lining to protect the trap proper against damage from the cutting action of the sand and to also provide a watertight joint at the opening to the trap.

The invention consists in the details of construction and in the combination and arrangement of the several parts of our improved sand trap whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view partly in section and partly in elevation illustrating a trap constructed in accordance with an embodiment of our invention;

Figure 2 is a sectional view taken substantially on the line 2—2 of Figure 1 looking in the direction of the arrows;

Figure 3 is a diagrammatic view illustrating a trap constructed in accordance with another embodiment of our invention;

Figure 4 is a diagrammatic view illustrating a trap constructed in accordance with a still further embodiment of our invention.

As disclosed in the accompanying drawing, 1 denotes a trap body of desired dimensions and open at its opposite ends, one end portion of the body being externally threaded, as at 2, to permit the proper mounting of the body with respect to the sand box or container B. This connection can, of course, be otherwise provided as may be preferred. The outer end of the body 1 is provided circumferentially therearound with a relatively broad flange 3, the peripheral face of which having threading thereon a union nut 4 for a purpose to be hereinafter more particularly referred to. The trap body 1 at a desired point intermediate its ends but preferably in relatively close proximity to its outer end has in communication therewith a sand delivery pipe 5.

Insertable within the body 1 through the outer end thereof is a lining sleeve 6, said sleeve when applied extending substantially from one end of the body 1 to the other but having an end portion extending beyond the outer end of the body 1 as is clearly illustrated in Figure 1 of the accompanying drawing. This lining sleeve 6 snugly fits within the body 1 but can be readily removed when desired. This sleeve serves to protect the body 1 against damage from the cutting action of the sand as it passes through the trap from the box or container B to the delivery pipe 5. The outer end portion of the sleeve 6 is surrounded by a collar 7 welded or otherwise rigidly secured to the sleeve 6 and this collar is received within an internal rabbet 8 provided in the outer end face of the trap body 1 for direct contact with a gasket 9 of rubber or other suitable material which is arranged within the rabbet against its inner side wall. The peripheral wall of the rabbet 8 at a desired point therearound is provided with a notch 10 in which is snugly received an outstanding lug 11 carried by the collar 7 whereby the applied lining sleeve 6 is effectively held against turning movement within the trap body 1 to assure the maintenance of the various parts in desired assembled relation.

The collar 7 also provides means for limiting the extent of insertion of the sleeve 6 within the trap body 1 and after the sleeve has been applied the union nut 4 is tightened to maintain the collar 7 in tight engagement with the gasket 9 thus assuring a water-tight joint at the outer end of the trap. Between the union nut 4 and the collar 7 is interposed a lock washer 12 which provides a pressure to maintain the collar 7 under all conditions tight against the soft gasket 9. The outer end of the lining sleeve 6 has threaded thereon or otherwise engaged therewith a cap 14 having at its central portion a port 15 for communication through the pipe line 16 with a suitable source of air under pressure. The free edge face of the applied cap 14 provides a shoulder 17 to prevent the complete removal of the union nut 4 and thus prevents the loss of said union nut 4 and the lock washer 12 when the lining sleeve 6 is removed for the purpose of cleaning or repair.

The lining sleeve 6 has an opening 18 cut out in its wall for register with the delivery pipe 5, said opening 18 being of a diameter equal to the diameter of the bore of the pipe 5 at its point of communication with the body 1. Welded or otherwise secured within the outer portion of the lining sleeve 6 is a plate 19 intersecting the bore of the sleeve 6 to provide a support for the pipes 20 and 21 and also coacting with the applied cap 14 to provide an air chamber 22. The pipe 20 has an end portion extending through the plate 19 into the chamber 22 and said pipe is of a length to extend beyond the opposite or inner end of the trap a distance sufficient to terminate within the box or container B. The extended portion of this pipe 20 terminates in a returned portion 20' which discharges into the trap whereby the sand within the box or container B is siphoned into the trap with the air discharged from the portion 20' of the pipe 20 and thereby assuring the delivery of the sand to the pipe 5. The pipe 21 also has an end portion extending within the chamber 22 and has its opposite end portion terminating in a nozzle 21' directed toward the axial center of the opening 18 in the lining sleeve 6 whereby an air blast is provided to assure the proper discharge of the sand through the pipe 5 for delivery upon a rail. The end portions of the pipes 20 and 21 within the air chamber 22 have inserted therein the air chokes 23 which provide means to limit the air supply to both the siphon pipe 20 and the blast pipe 21 to assure the delivery of a maximum amount of sand to a rail with a minimum amount of air to avoid the sand being blown from the rail and wasted.

It is to be noted that the plate 19 constitutes the sole support for the pipes 20 and 21 and that, therefore, said pipes are also removed with the withdrawal of the lining sleeve 6 from within the trap body 1 and ready access may be had to the chokes 23 for examination as may be required upon removal of the cap 14. This quick access to the chamber 22 may be further facilitated by having the pipe line 16 flexible.

In Figure 3 we illustrate an embodiment of the invention wherein the trap body 1' and the delivery pipe 5' are in the general form or arrangement of a Y, while in Figure 4 is shown two oppositely disposed delivery pipes 5ᵃ associated with the trap body 1ᵃ and in the general formation of a cross. In this latter embodiment two blast or blow pipes 21ᵃ are provided, one of which has a nozzle directed toward one of the pipes 5ᵃ and the other having its nozzle disposed toward the second pipe 5ᵃ. In the embodiment of the invention as illustrated in Figure 3 the blast or blow pipe 21ᵇ has its nozzle disposed in the same general direction as the portion of the pipe 5' adjacent to the trap.

It is to be stated that in referring to air under pressure in the descriptive matter or in the claims it is intended to include any other fluid which can be employed for the same purpose.

From the foregoing description it is thought to be obvious that a sand trap constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, and a blast pipe also carried by the plate and having a nozzle discharging through the opening in the sleeve.

2. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, and air chokes within the receiving ends of the siphon pipe and the blast pipe.

3. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, and means for limiting the extent of insertion of the lining sleeve within the trap body.

4. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, and means for holding the applied lining sleeve against turning movement within the trap body.

5. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, a collar carried by the outer end portion of the sleeve for coaction with the adjacent end of the trap body, a gasket interposed between the collar and the trap body and surrounding the sleeve, and a nut for holding the collar in close contact with the gasket.

6. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, a collar carried by the outer end portion of the sleeve for coaction with the adjacent end of the trap body, a gasket interposed between the collar and the trap body and surrounding the sleeve, a nut for holding the collar in close contact with the gasket, and a lock washer interposed between the nut and the collar.

7. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, a collar carried by the outer end portion of the sleeve for coaction with the adjacent end of the trap body, a gasket interposed between the collar and the trap body and surrounding the sleeve, a nut for holding the collar in close contact with the gasket, said nut being of a union type and threading upon the trap body.

8. A sand trap comprising a body for connection with a sand container and having a delivery pipe in communication therewith, a lining sleeve insertable within the body and having an opening registering with the delivery pipe, a plate intersecting the sleeve, means for placing the sleeve at one side of the plate in communication with a source of air under pressure, a siphon pipe carried by the plate, said siphon pipe being of a length to terminate adjacent to the receiving end of the trap, a blast pipe also carried by the plate and having a nozzle discharging through the opening in the sleeve, a collar carried by the outer end portion of the sleeve for coaction with the adjacent end of the trap body, a gasket interposed between the collar and the trap body and surrounding the sleeve, a nut for holding the collar in close contact with the gasket, said collar and the adjacent end portion of the trap body having a coacting recess and lug to hold the lining sleeve against turning movement within the trap body.

9. A sand trap comprising a tubular member for communication with a sand container, a sand delivery pipe having communication with the tubular member, a plate intersecting the member, means for placing the member at one side of the plate in communication with a source of fluid under pressure, a siphon pipe in communication with the member at the side just mentioned of the plate, said pipe discharging within the entrance end portion of the member, and a blast pipe in communication with the member at the side of the plate hereinbefore mentioned and discharging into the delivery pipe.

10. A sand trap comprising a tubular member for communication with a sand container, a sand delivery pipe having communication with the tubular member, a plate intersecting the member, means for placing the member at one side of the plate in communication with a source of fluid under pressure, a siphon pipe in communication with the member at the side just mentioned of the plate, said pipe discharging within the entrance end portion of the member, and a blast pipe in communication with the member at the side of the plate hereinbefore mentioned and discharging into the delivery pipe, said siphon pipe and blast pipe being supported by the plate.

11. A sand trap comprising a tubular member for communication with a sand container, a plurality of sand delivery pipes also communicating with the member, a plate intersecting the member to provide a fluid chamber therein, means for placing said chamber in communication with a source of fluid under pressure, a siphon pipe in communication with said chamber and discharging within the entrance end portion of the tubular member, and blast pipes also in communication with the chamber, each of said blast pipes discharging into one of the delivery pipes.

WILLIAM N. WRIGHT.
WILLIAM H. BEACH.